US011680824B1

(12) United States Patent
Navin et al.

(10) Patent No.: US 11,680,824 B1
(45) Date of Patent: Jun. 20, 2023

(54) INERTIAL MEASUREMENT UNIT FAULT DETECTION

(71) Applicant: Zoox, Inc., Foster City, CA (US)

(72) Inventors: Siddharth Ratapani Navin, Mountain View, CA (US); Derek Adams, Pasadena, CA (US); Michael Carsten Bosse, Cupertino, CA (US); Aleksandrs Ecins, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/460,834

(22) Filed: Aug. 30, 2021

(51) Int. Cl.
*G01C 25/00* (2006.01)
*G01C 21/16* (2006.01)

(52) U.S. Cl.
CPC .......... *G01C 25/005* (2013.01); *G01C 21/16* (2013.01)

(58) Field of Classification Search
CPC ............................ G01C 25/005; G01C 21/16
See application file for complete search history.

(56) References Cited

U.S. PATENT DOCUMENTS

| 2002/0169553 | A1* | 11/2002 | Perlmutter | G01C 21/165 |
| | | | | 701/472 |
| 2011/0178707 | A1* | 7/2011 | Sachs | G01C 17/38 |
| | | | | 701/472 |
| 2015/0354951 | A1* | 12/2015 | Ali | G01B 21/24 |
| | | | | 702/141 |
| 2018/0074201 | A1* | 3/2018 | Sakai | G01S 13/865 |
| 2019/0099124 | A1* | 4/2019 | Mattis | A61B 5/0022 |

FOREIGN PATENT DOCUMENTS

CN 112710327 A * 4/2021 ......... G01C 21/3453

* cited by examiner

Primary Examiner — Natalie Huls
Assistant Examiner — Cynthia L Davis
(74) Attorney, Agent, or Firm — Lee & Hayes, P.C.

(57) ABSTRACT

Techniques for, among other things, detecting faults associated with inertial measurement units (IMUs) of a vehicle when multiple IMUs are coupled to the vehicle are described herein. The techniques may include receiving first data from a first IMU of the vehicle and receiving second data from a second IMU of the vehicle. Based at least in part on the first data and the second data, a rotation of the first IMU relative to the second IMU may be calculated. The calculated rotation between the first IMU and the second IMU may be indicative of a fault associated with the first IMU or the second IMU. In response to detecting the fault, an action may be performed with respect to the first IMU or the second IMU to correct for the fault.

20 Claims, 5 Drawing Sheets

EQUATION FOR SOLVING RELATIVE ROTATION 302

$$\omega_p = A \times \omega_s + b$$

PRIMARY IMU READINGS 304

$$\omega_p = \begin{bmatrix} \omega_{px} \\ \omega_{py} \\ \omega_{pz} \\ \cdots \end{bmatrix}$$

ROTATION MATRIX 306

$$A = \begin{bmatrix} r_{11} & r_{12} & r_{13} \\ r_{21} & r_{22} & r_{23} \\ r_{31} & r_{32} & r_{33} \end{bmatrix}$$

SECONDARY IMU READINGS 308

$$\omega_s = \begin{bmatrix} \omega_{sx} \\ \omega_{sy} \\ \omega_{sz} \\ \cdots \end{bmatrix}$$

BIASES 310

$$b = \begin{bmatrix} b_x \\ b_y \\ b_z \end{bmatrix}$$

LEAST SQUARES FORMULATION FOR IMU READINGS 312

$$\omega_p = M \times X$$

M MATRIX 314

$$M = \begin{bmatrix} \omega_{sx} & \omega_{sy} & \omega_{sz} & 0 & 0 & 0 & 0 & 0 & 0 & 1 & 0 & 0 \\ 0 & 0 & 0 & \omega_{sx} & \omega_{sy} & \omega_{sz} & 0 & 0 & 0 & 0 & 1 & 0 \\ 0 & 0 & 0 & 0 & 0 & 0 & \omega_{sx} & \omega_{sy} & \omega_{sz} & 0 & 0 & 1 \\ & & & & & \cdots & & & & & & \end{bmatrix}$$

(3N × 12)

X MATRIX 316

$$X = \begin{bmatrix} r_{11} \\ r_{12} \\ r_{13} \\ r_{21} \\ r_{22} \\ r_{23} \\ r_{31} \\ r_{32} \\ r_{33} \\ b_x \\ b_y \\ b_z \end{bmatrix}$$

QR Decomposition of Rotation Matrix 306 (A = Q × R)

$$A = \begin{bmatrix} 0.86 & -0.5 & 0 \\ 0.5 & 0.86 & 0 \\ 0 & 0 & 1 \end{bmatrix} \quad Q = \begin{bmatrix} 0.86 & -0.5 & 0 \\ 0.5 & 0.86 & 0 \\ 0 & 0 & 1 \end{bmatrix} \quad R = \begin{bmatrix} 1 & 0 & 0 \\ 0 & 1 & 0 \\ 0 & 0 & 1 \end{bmatrix}$$

Rotation Matrix 306  
Orthogonal Matrix 402  
Upper-Triangular Matrix 404  
Diagonal Values 406

QR Decomposition of Rotation Matrix 306 (A = Q × R)

$$A = \begin{bmatrix} 0.86 & -0.5 & 0 \\ 0.5 & 0.86 & 0 \\ 0 & 0 & 5 \end{bmatrix} \quad Q = \begin{bmatrix} 0.86 & -0.5 & 0 \\ 0.5 & 0.86 & 0 \\ 0 & 0 & 1 \end{bmatrix} \quad R = \begin{bmatrix} 1 & 0 & 0 \\ 0 & 1 & 0 \\ 0 & 0 & 5 \end{bmatrix}$$

Rotation Matrix 306  
Orthogonal Matrix 402  
Upper-Triangular Matrix 404  
Diagonal Values 406

QR Decomposition of Rotation Matrix 306 (A = Q × R)

$$A = \begin{bmatrix} 0.91 & -0.41 & 0.2 \\ 0.5 & 0.86 & 0.2 \\ 0 & 0 & 1 \end{bmatrix} \quad Q = \begin{bmatrix} 0.86 & -0.5 & 0 \\ 0.5 & 0.86 & 0 \\ 0 & 0 & 1 \end{bmatrix} \quad R = \begin{bmatrix} 1 & 0.1 & 0.2 \\ 0 & 1 & 0.2 \\ 0 & 0 & 1 \end{bmatrix}$$

Rotation Matrix 306  
Orthogonal Matrix 402  
Upper-Triangular Matrix 404  
Off-Diagonal Values 408

FIG. 4C

INERTIAL MEASUREMENT UNIT FAULT DETECTION

BACKGROUND

Today's vehicles generally include sensors for assisting in data collection and vehicle operations. These sensors capture data that can be used to determine information about a vehicle, as well as information about an environment in which the vehicle is operating, which may not otherwise be detectable by an operator of the vehicle. Generally, sensors are calibrated before being installed in a vehicle to ensure they are functioning properly. However, current techniques for calibrating sensors can be tedious because, in most cases, only a single sensor can be calibrated at a given time. Additionally, current techniques do not account for the specific use cases in which a sensor may be used, and additional calibration beyond simple bench-type testing may be necessary. Further, current calibration techniques do not allow for detection of sensor anomalies after installation or while in use, and in scenarios in which multiple sensors of the same type are in use, current techniques do not ensure that individual sensors are correctly calibrated relative to other sensors.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates various example equations and matrices that may be used to calculate or otherwise determine a rotation of an inertial measurement unit relative to another inertial measurement unit.

FIGS. 4A-4C illustrate various example QR decompositions of an estimated rotation matrix to determine a pure rotational part of the estimated rotation matrix.

DETAILED DESCRIPTION

Figure 1:
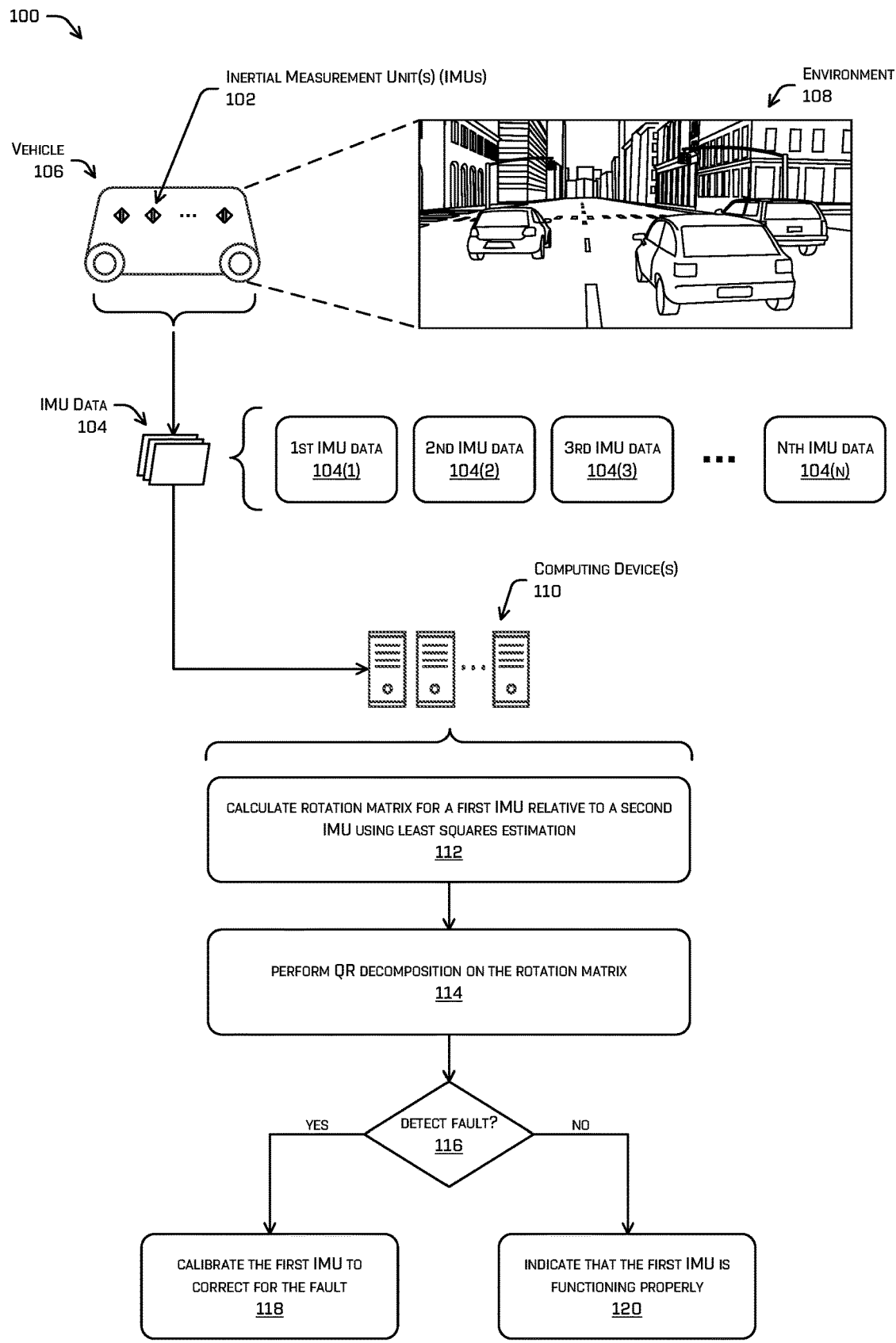
FIG. 1 is a pictorial flow diagram illustrating an example process in which multiple inertial measurement units capture data associated with a vehicle traversing an environment, and that data is used to calibrate one of the inertial measurement units to correct for a detected fault.

As discussed above, vehicle sensors are typically calibrated before being installed in a vehicle to ensure they are functioning properly. However, current techniques for calibrating sensors can be tedious because, in most cases, only a single sensor can be calibrated at a given time. Additionally, current techniques do not account for the specific use cases in which a sensor may be used, and additional calibration beyond simple bench-type testing may be necessary. Further, current calibration techniques do not allow for detection of sensor anomalies after installation or while in use, and in scenarios in which multiple sensors of the same type are in use, current techniques do not ensure that individual sensors are correctly calibrated relative to other sensors.

For instance, a vehicle may include multiple inertial measurement unit (IMU) sensors. When these IMUs are tested or calibrated before being installed in a vehicle, the extent of these tests may only determine whether a specific IMU has been manufactured properly and is operating within specifications. As such, these tests are not able to account for, among other things, whether an IMU is properly fixed to a mounting surface of a vehicle, whether a first IMU is properly scaled with respect to other IMUs, whether the first IMU is sheared compared to the other IMUs, faults that have occurred with respect to an IMU after it has been in service in a vehicle, whether the device has been moved (e.g., by minor or major collisions), and/or the like.

This application is directed to improved techniques for detecting faults associated with IMUs when multiple IMUs are attached to a single rigid body. For instance, when multiple IMUs are coupled to a rigid body (e.g., a vehicle), a rotation of a first IMU relative to one or more other IMUs may be estimated when the location/position of the IMUs relative to one another is known. This is because each IMU is attached to the same rigid body, so gyroscope measurements obtained from each of the IMUs should be approximately equal (e.g., the angular velocity measured by a first IMU should be approximately equal to the angular velocity measured by the one or more other IMUs). As such, to determine the rotation of a first IMU relative to a second IMU to determine whether the first IMU or the second IMU is in a fault state, first IMU data associated with the first IMU and second IMU data associated with the second IMU may be obtained. The first IMU data and the second IMU data may then be used to calculate the rotation of the first IMU relative to the second IMU (or vice-versa) using a least squares estimation and, in some instances, matrix QR decomposition. When the relative rotation is calculated, the relative rotation may be indicative of whether the first IMU or the second IMU is in a faulted state, and an action may be performed with respect to the first IMU or the second IMU to correct for the faulted state.

As alluded to above, detecting IMU faults and/or calibrating IMUs according to the techniques described herein has several advantages not offered by prior techniques. For instance, by estimating a rotation of a first IMU relative to one or more other IMUs, it may be determined whether the first IMU or one of the other IMUs is properly fixed to a mounting surface (e.g., the IMU does not move independently of the rigid body it is coupled to). Additionally, by estimating rotations of multiple IMUs attached to the same rigid body, it may be determined whether the IMUs are properly scaled with respect to one another, whether an IMU is sheared with respect to the other IMUs, as well as whether faults have occurred after the IMUs have been in service, etc. Further, the techniques disclosed allow for the testing, calibration, and validation of IMUs on vehicle (or in application) as opposed to bench-type testing. In other words, the disclosed techniques allow for IMUs to be tested under conditions that they will actually be used for in their real-world application. Other improvements not described will be easily apparent to those possessing ordinary skill in the art.

By way of example, and not limitation, a method according to the techniques described herein may include receiving first data from a first inertial measurement unit (IMU) of a vehicle and receiving second data from a second IMU of the vehicle. In some examples, the first IMU and the second IMU may be coupled to a rigid surface of the vehicle. Additionally, the first IMU may be positioned at a first location of the vehicle and the second IMU may be positioned at a second location of the vehicle that is different from the first location. In some examples, the first data and the second data may be received substantially simultaneously (e.g., within 1 Hz, 1 kHz, 1 MHz, etc. of one another). Additionally, the first data and the second data may be associated with a same period of time. In some examples, third data, fourth data, and so forth may be received from a third IMU of the vehicle, a fourth IMU of the vehicle, and so forth. An example IMU of a vehicle may include one or more accelerometer(s), gyroscope(s), and/or magnetometer(s), in any one of a plurality of axes.

In some examples, the first data and the second data may be representative of a movement of the vehicle while the vehicle is traversing an environment. For instance, the first data and the second data may be indicative that the vehicle is turning, accelerating, decelerating, and the like. Additionally, or alternatively, the movement of the vehicle may be caused by a suspension system of the vehicle that may raise or lower a body portion of the vehicle relative to the wheels or axles of the vehicle. In some examples, the first data may be first gyroscope data measured by a first gyroscope of the first IMU and the second data may be second gyroscope data measured by a second gyroscope of the second IMU. The first gyroscope data and the second gyroscope data may also be representative or indicative of the movement of the vehicle.

In some examples, a rotation of the first IMU relative to the second IMU may be determined. For instance, the rotation of the first IMU relative to the second IMU may be calculated and/or estimated based at least in part on the first data and the second data. In some examples, the rotation of the first IMU relative to the second IMU may be calculated and/or estimated by inputting the first data and the second data into one or more least squares estimation equations to solve for the relative rotation. Additionally, or alternatively, the rotation of the first IMU relative to the second IMU may be calculated and/or estimated based on calculating a rotation matrix that is indicative of the fault associated with the first IMU, and then performing matrix decomposition (e.g., a QR decomposition) with respect to the rotation matrix to extract the pure rotation part (e.g., the rotation without additional factors, such as bias that may distort the pure rotational component between the two sensors). A "QR decomposition" of a matrix is a decomposition of a matrix A into a product where A is equal to Q times R (e.g., A=QR), and where Q is an orthogonal matrix and R is an upper triangular matrix. In some examples, diagonal values of the rotation matrix may be indicative of whether the fault is a scale error associated with the first IMU or the second IMU. Additionally, non-diagonal values of the rotation matrix may be indicative of whether the fault is a shear error associated with the first IMU or the second IMU. For instance, the ideal value of the rotation matrix is to be equal to an identity matrix (e.g., each main diagonal value is equal to one and each off-diagonal value is equal to zero). As such, if the diagonal elements are not equal to one, then this may be indicative of a scale error. And if the non-diagonal elements are not equal to zero, this may be indicative of a shear error.

In some examples, the rotation of the first IMU relative to the second IMU may be indicative of a fault associated with either the first IMU or the second IMU. For instance, the fault associated with the first IMU or the second IMU may be a scale error, a shear error, a rotation error, a translation error, and/or the like. As used herein, a "scale error" means a fault caused by an IMU having the wrong scale factor setting. For instance, when an IMU has a wrong scale factor setting, a gyroscope measurement may indicate that the rigid body to which the IMU is attached is turning at a rate of 2 radians per sec (rad/s) when in reality the rigid body is turning at a rate of 1 rad/s (e.g., the scale factor should be set to 0.5). As used herein, a "shear error" means a fault caused by an IMU not being properly aligned to its respective x, y, and z axes. For instance, when an IMU has a shear error, if the rigid body to which the IMU is coupled is being rotated solely about the y axis, the IMU gyroscope reading may erroneously indicate that the rigid body is also being rotated about the x axis and/or the z axis. As used herein, an IMU "rotation error" means a fault caused by the IMU moving independently of the rigid body to which it is coupled. This may be caused by the IMU not being properly secured to the rigid body.

If a fault is detected, in some instances an action may be performed with respect to the first IMU or the second IMU to correct for the fault. For instance, the action to correct for the fault may include recalibrating the IMU to correct for the fault, reinstalling a new software driver to connect to the IMU, causing the faulty IMU component to be replaced or recoupled to the vehicle (e.g., outputting an indication that the IMU component needs to physically be replaced with a new IMU component or recoupled to the vehicle), and the like. In some instances, which action(s) are performed may be based at least in part on the type of fault detected. For instance, if the fault is a scale error, the IMU may need to be recalibrated or the software driver may need to be reinstalled, updated, etc. As another example, if the fault is a shear error, the IMU may need to be recalibrated or, depending on how severe of a shear error, the IMU component may need to be wholly replaced or remounted to the vehicle. Similarly, if a rotational error is detected, the IMU may need to be remounted to the vehicle to secure it to the vehicle such that the IMU component does not move independently of the vehicle, or the rotational error may be accounted for in software such that the IMU does not need to be physically replaced. In some examples, if a fault is detected, an action may be performed with respect to the vehicle, such as causing the vehicle to pull over, causing the vehicle to disregard sensor data from a faulty sensor, causing the vehicle to "trust" the sensor data from the faulty sensor less than other sensors (e.g., by downweighting contributions from the sensor), and the like.

In some examples, when two IMUs are mounted to a same rigid body, computing the relative rotations may only be indicative of a fault in general, and which IMU is faulty may not be immediately apparent. When more than two IMUs (e.g., 3, 4, 5, 6, etc.) are mounted to the same rigid body, however, additional relative rotations may be computed and a specific IMU that is faulty may be identified. For instance, third data may be received from a third IMU of the vehicle, and a second rotation of the second IMU relative to the third IMU may be calculated based at least in part on the second data and the third data. The second rotation of the second IMU relative to the third IMU may be indicative of whether the faulty IMU is the second IMU or the first IMU. For instance, if the second rotation of the second IMU relative to the third IMU does not indicate an error associated with either the second IMU or the third IMU, then it may be determined that the first IMU is the faulty IMU. Alternatively, if the second rotation of the second IMU relative to the third IMU indicates an error associated with either the second IMU or the third IMU, then it may be determined that the second IMU is the faulty IMU since there was a fault between the first IMU and the second IMU relative rotation and the second IMU and third IMU relative rotation. In such examples, comparisons may be performed combinatorially between pairs of such sensors in order to determine which, if any, is malfunctioning (or otherwise a source of error). Of course, though described mostly with respect to rotational errors, similar techniques may be used to determine translational errors such as, for example, by using estimated rotation rates and assumed translations (e.g., based on prior measurement and/or design) to determine errors in translation.

These and other aspects are described further below with reference to the accompanying drawings. The drawings are merely example implementations and should not be construed to limit the scope of the claims. For example, while the example vehicles are shown and described as being autonomous vehicles that are capable of navigating between locations without human control or intervention, techniques described herein are also applicable to non-autonomous and/or semi-autonomous vehicles. Additionally, while the examples are described with respect to IMUs coupled to vehicles, it is to be understood that the techniques may be equally applicable for detecting faults of IMUs connected to other rigid bodies (e.g., rate tables, aircraft, watercraft, etc.), as well as detecting faults for other sensors of a vehicle, such as accelerometers.

FIG. 1 is a pictorial flow diagram illustrating an example process 100 in which multiple inertial measurement units (IMUs) 102 capture data 104 associated with a vehicle 106 traversing an environment 108, and that data 104 is used to calibrate one of the IMUs 102 to correct for a detected fault. For instance, the vehicle 106 may receive driving instructions (e.g., a route) to traverse the environment 108. The driving instructions may cause the vehicle 106 to navigate a route that includes a variety of turns, stops, starts, hill climbs, descents, speed bumps, and the like. Such a route may ensure that the IMUs 102 capture data 104 associated with a variety of movements of the vehicle 106.

The IMUs 102 may include multiple IMUs that are coupled to a rigid portion of the vehicle (e.g., frame, body, etc.). In some examples, an individual IMU 102 may include one or more gyroscopes, accelerometers, magnetometers, and the like. For instance, an individual IMU sensor 102 may include a gyroscope, accelerometer, and magnetometer for each of the three principal axes (e.g., roll, pitch, and yaw). In some examples, each IMU 102 of the vehicle 106 may generate IMU data 104 while the vehicle 106 is traversing the environment 108. That is, the IMU data 104 may include first IMU data 104(1) generated by a first IMU 102 of the vehicle 106, second IMU data 104(2) generated by a second IMU 102 of the vehicle 106, third IMU data 104(3) generated by a third IMU 102 of the vehicle 106, . . . , and Nth IMU data 104(N) generated by an Nth IMU 102 of the vehicle 106 (where N represents any number greater than or equal to four in this example).

The IMU data 104 may be sent to one or more computing devices 110 associated with the vehicle 106. In some examples, the one or more computing devices 110 may be remote from the vehicle 106, and the IMU data 104 may be sent to the one or more computing devices 110 via one or more wired or wireless networks. In other examples, the one or more computing devices 110 may be located on-board the vehicle 106. For instance, the one or more computing devices 110 may comprise a vehicle computing device as described in further detail below in FIG. 2.

Additionally, the one or more computing devices 110 may perform one or more operations, such as operations 112-118, using the IMU data 104 to detect faults associated with the IMUS 102 of the vehicle 106. For instance, at operation 112, the computing devices 110 may calculate a rotation matrix for a first IMU 102 relative to a second IMU 102 using a least squares estimation method. Because the first IMU 102 and the second IMU 102 are attached to the same rigid body of the vehicle 106, their measured angular velocities associated with the vehicle 106 traversing the environment 108 should ideally be the same. The rotation matrix calculated by the one or more computing devices 110 may be indicative of any differences between measurements of the first IMU 102 and the second IMU 102.

At operation 114, the one or more computing devices 110 may perform QR decomposition on the calculated rotation matrix to extract the pure rotation part. That is, the rotation matrix may be decomposed into a product where the rotation matrix is equal to an orthogonal matrix "Q" times an upper triangular matrix "R" (e.g., rotation matrix=QR).

At operation 116, the one or more computing devices 110 may detect associated with the first IMU 102 (e.g., whether the first IMU 102 has a scale error, shear error, rotation error, etc.). If the one or more computing devices 110 detect a fault associated with the first IMU 102 (e.g., based at least in part on the rotational matrix determined), then the process may proceed to operation 118. However, if no fault is detected, the process may proceed to operation 120. For instance, the diagonal values of the R matrix described in the preceding paragraph and herein may be indicative of whether the fault is a scale error associated with the first IMU. Additionally, the non-diagonal values of the R matrix may be indicative of whether the fault is a shear error associated with the first IMU. For instance, the ideal value of the R matrix is an identity matrix. As such, if the diagonal elements are not equal to one, then this may be indicative of a scale error associated with the first IMU 102. And if the non-diagonal elements are not equal to zero, this may be indicative of a shear error associated with the first IMU 102. Other errors that may be detected may include offset errors, misalignment errors, cross axis sensitivity errors, noise, and environment sensitivity errors.

At operation 118, the one or more computing devices 110 may calibrate the first IMU 102 to correct for the fault. Additionally, or alternatively, the calibration of the first IMU 102 may be performed in whole or in part by a human operator, a machine-learned model that is trained to recalibrate the first IMU 102 based on the value of the R matrix, and the like. In some examples, calibrating the first IMU 102 to correct for the fault may include adjusting a scale factor associated with the first IMU 102, updating a driver setting associated with the first IMU 102 or a computing device connected to the first IMU 102, adjusting a setting or parameter of the first IMU 102 to correct for a shear error, and/or the like.

At operation 120, if no fault is detected, then the one or more computing devices 110 may indicate that the first IMU is functioning properly. For instance, the one or more computing devices 110 may send an output to a human teleoperator monitoring the vehicle 106 indicating that the IMU is functioning properly. In some instances, if there is no fault detected, the one or more computing devices 110 may store an indication that the first IMU 102 is functioning properly and/or refrain from checking whether the IMU is functioning properly for a period of time. In at least one example, if no fault is detected, the one or more computing devices 110 may perform no action.

Figure 2:
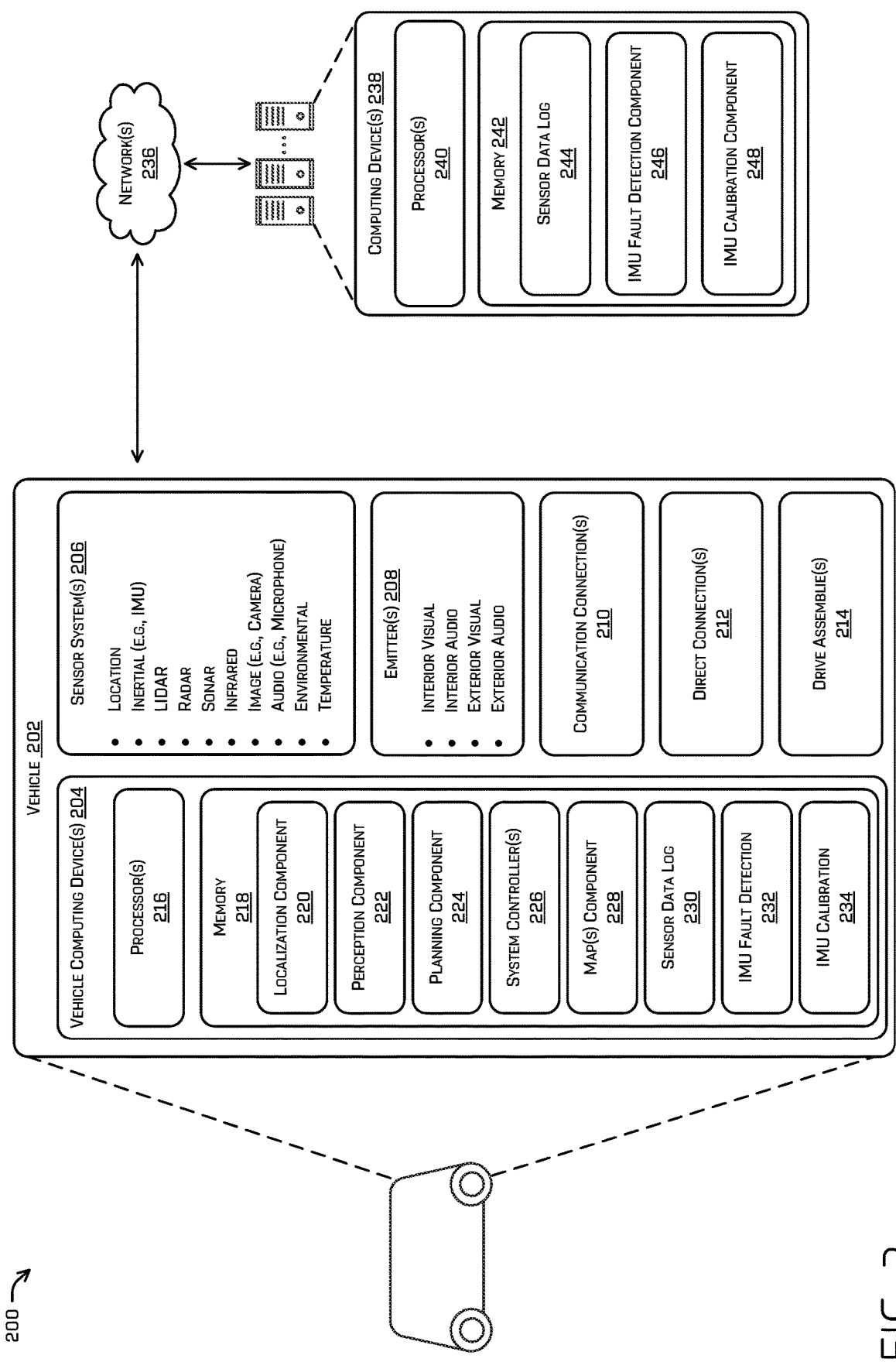
FIG. 2 is a block diagram illustrating an example system for implementing some of the various technologies described herein.

FIG. 2 is a block diagram illustrating an example system 200 for implementing some of the various technologies described herein. In some examples, the system 200 may include one or multiple features, components, and/or functionality of examples described herein with reference to other figures.

The system 200 may include a vehicle 202. In some examples, the vehicle 202 may include some or all of the features, components, and/or functionality described above with respect to the vehicle 102. For instance, the vehicle 202 may comprise a bidirectional vehicle. As shown in FIG. 2, the vehicle 202 may also include a vehicle computing device 204, one or more sensor systems 206, one or more emitters 208, one or more communication connections 210, one or more direct connections 212, and/or one or more drive assemblies 214.

The vehicle computing device 204 can, in some examples, include one or more processors 216 and memory 218 communicatively coupled with the one or more processors 216. In the illustrated example, the vehicle 202 is an autonomous vehicle; however, the vehicle 202 could be any other type of vehicle (e.g., automobile, truck, bus, aircraft, watercraft, train, etc.), or any other system having components such as those illustrated in FIG. 2 (e.g., a robotic system, an automated assembly/manufacturing system, etc.). In examples, the one or more processors 216 may execute instructions stored in the memory 218 to perform one or more operations on behalf of the one or more vehicle computing devices 204.

The memory 218 of the one or more vehicle computing devices 204 can store a localization component 220, a perception component 222, a planning component 224, one or more system controllers 226, a map(s) component 228, a sensor data log 230, an IMU fault detection component 232, and an IMU calibration component 234. Though depicted in FIG. 2 as residing in memory 218 for illustrative purposes, it is contemplated that the localization component 220, perception component 222, planning component 224, one or more system controllers 226, map(s) component 228, sensor data log 230, IMU fault detection component 232, and/or IMU calibration component 234 can additionally, or alternatively, be accessible to the vehicle 202 (e.g., stored on, or otherwise accessible from, memory remote from the vehicle 202, such as memory 242 of one or more computing devices 238).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 206 or received from one or more other devices (e.g., computing devices 236) to accurately determine a location of the autonomous vehicle. In some instances, the localization component 220 can provide data to various components of the vehicle 202 to determine an initial position of the autonomous vehicle for generating a trajectory and/or for determining to retrieve map data.

In some instances, the perception component 222 can include functionality to perform object tracking, detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional and/or alternative examples, the perception component 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 224 can determine a path for the vehicle 202 to follow to traverse through an environment. For example, the planning component 224 can determine various routes and trajectories and various levels of detail. For example, the planning component 224 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate. In at least one example, the planning component 224 may determine a path for the vehicle 202 to follow to traverse through the environment such that IMU data may be generated to determine if one or more IMUS of the vehicle 202 is experiencing a fault.

In at least one example, the vehicle computing device 204 can include one or more system controllers 226, which can be configured to control steering, propulsion, braking, safety, emitters, communication, components, and other systems of the vehicle 202. These system controller(s) 226 can communicate with and/or control corresponding systems of the drive assembly(s) 214 and/or other components of the vehicle 202.

The memory 218 can further include the map(s) component 228 to maintain and/or update one or more maps (not shown) that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 202 can be controlled based at least in part on the maps. That is, the maps can be used in connection with the localization component 220, the perception component 222, and/or the planning component 224 to determine a location of the vehicle 202, identify objects in an environment, and/or generate routes and/or trajectories to navigate within an environment. Additionally, the maps can be used in connection with the web-based application to generate content associated with the vehicle 202, such as a data visualization.

In some examples, the one or more maps can be stored on a remote computing device(s) (such as the computing device(s) 238) accessible via one or more network(s) 236. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 218 may also store a sensor data log 230. The sensor data log 230 may include sensor data captured by the sensor systems of the vehicle 202 while the vehicle is operating in an environment. For instance, the sensor data log 230 may include IMU measurement data generated by the IMUs of the vehicle 202 while the vehicle was operating in the environment. The data stored within the sensor data log 230 may be used by the IMU fault detection component 232 to detect faults associated with the IMUs of the vehicle 202.

The memory 218 can further include an IMU fault detection component 232. The IMU fault detection component 232 may perform operations described herein for detecting faults associated with the IMUs of the vehicle 202. That is, the IMU fault detection component 232 may input IMU data generated by the vehicle 202 IMUs into least squares estimation equations and perform matrix QR decomposition to determine whether an IMU is in a faulted state. In some examples, the IMU fault detection component 232 may detect faults associated with the IMUs of the vehicle 202 using measurement data generated by the IMUs while the vehicle 202 is in operation, or the IMU fault detection component 232 may use data from the sensor data log 230.

As shown, the memory 218 may also store an IMU calibration component 234. The IMU calibration component 234 may be used to recalibrate an IMU based on a detected fault. For instance, the IMU calibration component 234 may receive indications of faults associated with an IMU from the IMU fault detection component 232 and recalibrate the IMU to correct for the fault. In some examples, the IMU calibration component 234 may receive a rotation matrix (or an "R" matrix component of the rotation matrix after QR decomposition is performed) from the IMU fault detection component 232 and correct for the fault accordingly by updating software, firmware, driver settings, and the like. For instance, based on the rotation matrix a difference between the current IMU settings and the properly calibrated IMU settings may be determined, and the IMU settings may be adjusted to minimize the difference.

In some instances, aspects of some or all of the memory-stored components discussed herein can include any models, algorithms, and/or machine learning algorithms. For example, in some instances, components in the memory 218 (and the memory 240, discussed in further detail below) such as the localization component 220, the perception component 222, and/or the planning component 224 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 206 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 206 can include multiple instances of each of these or other types of sensors. For instance, the lidar sensors can include individual lidar sensors located at the corners, front, back, sides, and/or top of the vehicle 202. As another example, the image sensors can include multiple image sensors disposed at various locations about the exterior and/or interior of the vehicle 202. As an even further example, the inertial sensors can include multiple IMUS coupled to the vehicle 202 at various locations. The sensor system(s) 206 can provide input to the vehicle computing device 204. Additionally, or alternatively, the sensor system(s) 206 can send sensor data, via the one or more networks 236, to the one or more computing device(s) 238 at a particular frequency, after a lapse of a predetermined period of time, in near real-time, etc.

The vehicle 202 can also include one or more emitters 208 for emitting light and/or sound. The emitters 208 in this example include interior audio and visual emitters to communicate with passengers of the vehicle 202. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive assembly(s) 214. Also, the communication connection(s) 210 can allow the vehicle 202 to communicate with other nearby computing device(s) (e.g., other nearby vehicles, traffic signals, laptop computer 146, etc.). The communications connection(s) 210 also enable the vehicle 202 to communicate with a remote teleoperations system or other remote services.

The communications connection(s) 210 can include physical and/or logical interfaces for connecting the vehicle computing device(s) 204 to another computing device (e.g., computing device(s) 236) and/or a network, such as network(s) 236. For example, the communications connection(s) 210 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 212 of vehicle 202 can provide a physical interface to couple the one or more drive assembly(s) 214 with the body of the vehicle 202. For example, the direct connection 212 can allow the transfer of energy, fluids, air, data, etc. between the drive assembly(s) 214 and the vehicle 202. In some instances, the direct connection 212 can further releasably secure the drive assembly(s) 214 to the body of the vehicle 202.

In at least one example, the vehicle 202 can include one or more drive assemblies 214. In some examples, the vehicle 202 can have a single drive assembly 214. In at least one example, if the vehicle 202 has multiple drive assemblies 214, individual drive assemblies 214 can be positioned on opposite longitudinal ends of the vehicle 202 (e.g., the leading and trailing ends, the front and the rear, etc.). In at least one example, a single drive assembly 214 of the vehicle 202 may include one or more IMU sensors.

The drive assembly(s) 214 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 214 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 214. Furthermore, the drive assembly(s) 214 may also include one or more communication connection(s) that enable communication by the respective drive assembly with one or more other local or remote computing device(s).

The computing device(s) 238 can include one or more processors 240 and memory 242 that may be communicatively coupled to the one or more processors 240. The memory 242 may store a sensor data log 244, an IMU fault detection component 246, and an IMU calibration component 248. In some examples, the computing device(s) 238 may be associated with a teleoperations system that remotely monitors a fleet of vehicles. Additionally, or alternatively, the computing devices(s) 238 may be leveraged by the teleoperations system to receive and/or process data on behalf of the teleoperations system.

The sensor data log 244 may store similar data to that of the sensor data log 230. For instance, the sensor data log 244 may include sensor data captured by the sensor systems of the vehicle 202 while the vehicle is operating in an environment. The sensor data log 244 may include IMU measurement data generated by the IMUs of the vehicle 202 while the vehicle was operating in the environment. The data stored within the sensor data log 244 may be used by the IMU fault detection component 246 to detect faults associated with the IMUs of the vehicle 202.

The IMU fault detection component 246 may perform operations described herein for detecting faults associated with the IMUs of the vehicle 202, similar to that of the IMU fault detection component 232. That is, the IMU fault detection component 246 may input IMU data generated by the vehicle 202 IMUs into least squares estimation equations and perform matrix QR decomposition to determine whether an IMU is in a faulted state. In some examples, the IMU fault detection component 246 may detect faults associated with the IMUs of the vehicle 202 using measurement data generated by the IMUs while the vehicle 202 is in operation, or the IMU fault detection component 246 may use data from the sensor data log 244.

The IMU calibration component 248 may be similar to the IMU calibration component 234 and may be used to recalibrate an IMU based on a detected fault. For instance, the IMU calibration component 248 may receive indications of faults associated with an IMU from the IMU fault detection component 246 and recalibrate the IMU to correct for the fault. In some examples, the IMU calibration component 248 may receive a rotation matrix (or an "R" matrix component of the rotation matrix after QR decomposition is performed) from the IMU fault detection component 246 and correct for the fault accordingly.

The processor(s) 216 of the vehicle 202 and the processor(s) 240 of the computing device(s) 236 can be any suitable processor capable of executing instructions to process data and perform operations as described herein. By way of example and not limitation, the processor(s) 216 and 240 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 242 are examples of non-transitory computer-readable media. The memory 218 and 242 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 2 is illustrated as a distributed system, in alternative examples, components of the vehicle 202 can be associated with the computing device(s) 238 and/or components of the computing device(s) 238 can be associated with the vehicle 202. That is, the vehicle 202 can perform one or more of the functions associated with the computing device(s) 238, and vice versa.

FIG. 3 illustrates various example equations and matrices 300 that may be used to calculate or otherwise determine a rotation of an inertial measurement unit relative to another inertial measurement unit. The equations and matrices 300 may be used by the computing devices 110 to solve for the rotation of a first IMU relative to a second IMU.

The equation 302 may be an equation for solving for the relative rotation of a first IMU with respect to a second IMU. The equation 302 includes the variable "$\omega_p$," which corresponds to the primary IMU readings matrix 304. Of course, it should be understood that an optimization may be performed based on determining a residual (e.g., a difference) based at least in part on the primary readings and the elements on the right hand side of equation 302. The primary IMU readings matrix 304 may be equal in size to 3N X 1, where N is equal to the number of IMU readings. The primary IMU readings matrix 304 may include gyroscope measurements from the first IMU (e.g., angular velocity measurements or rotational measurements associated with each axis of the gyroscope). The equation 302 also includes the variable "A," which corresponds to the rotation matrix 306 that the equations 300 are used to solve for. The rotation matrix 306 may be indicative of the rotation of the primary IMU readings $\omega_p$ relative to the secondary IMU readings "$\omega_s$" (or vice-versa), which are included in the equation 302 in the secondary IMU readings matrix 308. The secondary IMU readings matrix 308 may be equal in size to 3N X 1, where N is equal to the number of IMU readings. The secondary IMU readings matrix 308 may include gyroscope measurements from the second IMU (e.g., angular velocity measurements or rotational measurements associated with each axis of the gyroscope). The equation 302 may also include the variable "b," which corresponds to the biases matrix 310. The biases matrix 310 may factor in and/or correct for noise issues associated with the IMUS that are being tested.

In the equation 302 where $\omega_p = A \times \omega_s + b$, the unknown variables may include the variable A and the variable b. In other words, the values "$r_{11}$," "$r_{12}$," "$r_{13}$," and so forth included in the rotation matrix 306 are not known, and the values "$b_x$," "$b_y$," and "$b_z$" in the biases matrix 310 are also not known. However, using the equation 302 and the equation 312, which represents the least squares formulation for IMU readings, the values of the matrices 306 and 310 may be solved for.

The equation 312, where $\omega_p = M \times X$, includes the variables "$\omega_p$," "M," and "X." As noted above, $\omega_p$ corresponds to the primary IMU readings matrix 304. The variable M corresponds to the M matrix 314 shown in FIG. 3. The M matrix 314 is of a size that is equal to 3N X 12, where N is equal to the number of IMU readings from the secondary IMU $\omega_s$. In other words, the number of rows included in the M matrix 314 is equal to three times the number of IMU readings of the second IMU. The X matrix 316 is a 12 X 1 matrix that includes the values from the rotation matrix 306 and the biases matrix 310. Using the equations 302 and 312, the rotation matrix 306 and the biases 310 may be solved for.

FIGS. 4A-4C illustrate various example QR decompositions 400(A)-400(C) of the rotation matrix 306 to determine the pure rotational part of the rotation matrix 306. A QR decomposition is the decomposition of a matrix A (e.g., the rotation matrix 306) into a product of an orthogonal matrix 402 "Q" and an upper-triangular matrix 404 "R." In at least one example, the example QR decompositions 400(A)-400(C) may be performed on the rotation matrix 306 after the rotation matrix 306 is solved for using the equations and matrices 300 shown in FIG. 3.

In the example QR decomposition 400(A), the rotation matrix 306 is decomposed into the orthogonal matrix Q 402 and the upper-triangular matrix R 404. The diagonal values 406 of the upper-triangular matrix 404 R may be indicative of whether an IMU has a scale factor error. However, because all of the diagonal values 406 are equal to one, there is no scale factor error associated with one of the IMUS.

In the example QR decomposition 400(B), the rotation matrix 306 is decomposed into the orthogonal matrix Q 402 and the upper-triangular matrix R 404. The diagonal values 406 of the upper-triangular matrix 404 R are indicative of a scale factor error associated with one of the IMUS (e.g., either the primary IMU $\omega_p$ or the secondary IMU $\omega_s$) since not all of the diagonal values 406 are equal to one. For instance, the upper-triangular matrix 404 R shown in the QR decomposition 400(B) has a scale factor error associated with at least the Z axis. As such, a setting associated with the IMU or the Z axis of the IMU may be adjusted to correct for the scale factor error.

In the example QR decomposition 400(C), the rotation matrix 306 is decomposed into the orthogonal matrix Q 402 and the upper-triangular matrix R 404. The off-diagonal values 408 of the upper-triangular matrix 404 R are indicative of a shear error associated with one of the IMUs (e.g., either the primary IMU $\omega_p$ or the secondary IMU $\omega_s$) since the off-diagonal values 408 are non-zero.

Figure 5:
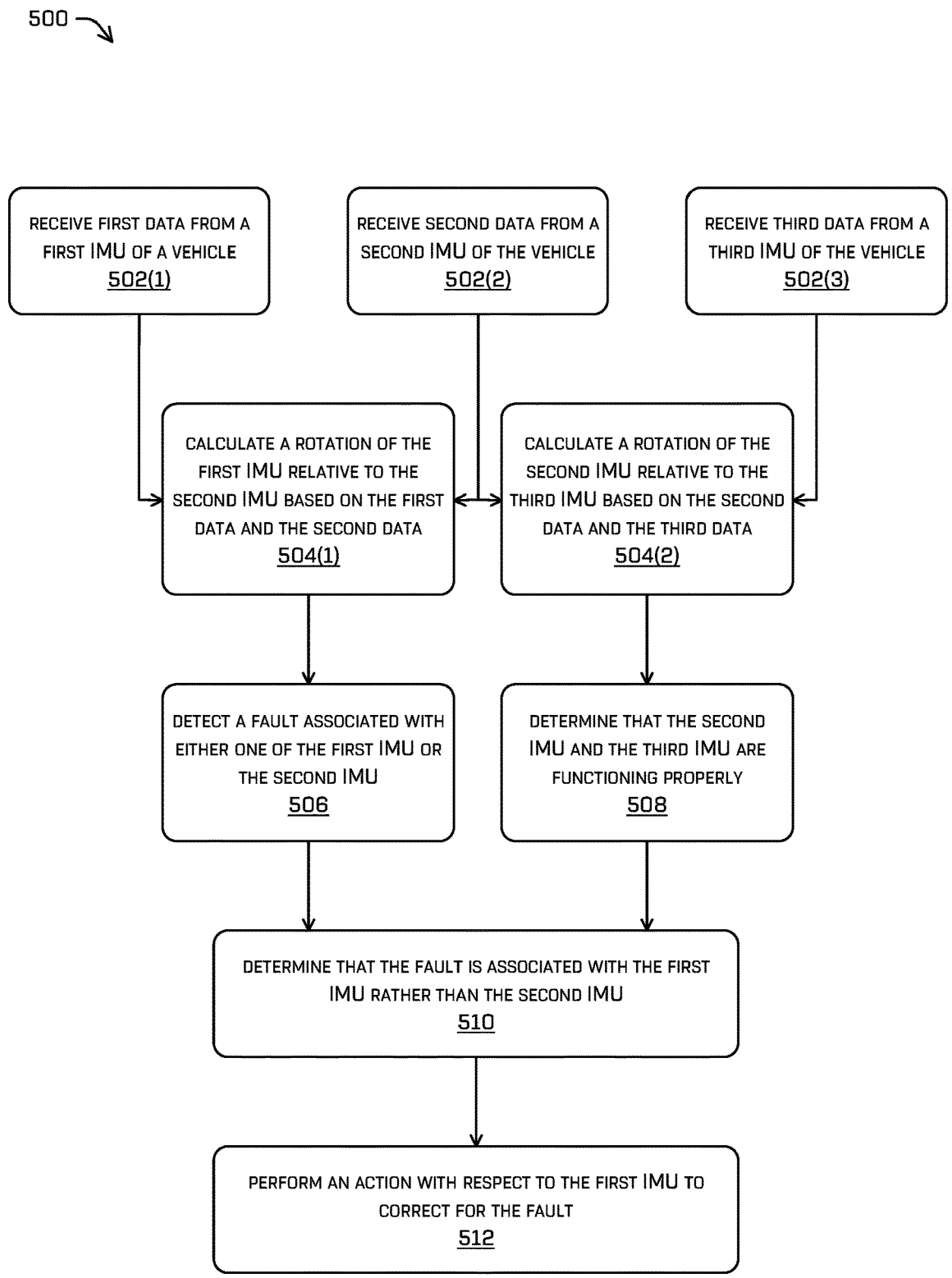
FIG. 5 is a flowchart illustrating an example method for detecting a fault associated with an inertial measurement unit according to the techniques described herein.

FIG. 5 is a flowchart illustrating an example method 500 for detecting a fault associated with an inertial measurement unit according to the techniques described herein. The method 500 illustrated in FIG. 5 is described with reference to one or more of the vehicles or systems described in FIGS. 1-4C for convenience and ease of understanding. However, the method 500 illustrated in FIG. 5 is not limited to being performed using the vehicles and systems described in FIGS. 1-4C, and may be implemented using any of the other vehicles, systems, and technologies described in this application, as well as vehicles, systems, and technologies other than those described herein. Moreover, the vehicles, systems, and technologies described herein are not limited to performing the method 500 illustrated in FIG. 5.

The method 500 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the method 500 may be combined in whole or in part with other methods.

The method 500 begins at operation(s) 502(1)-502(3), which each include receiving first data, second data, and third data from a first IMU, second IMU, and third IMU, respectively, of a vehicle. For instance, the computing devices 110 may receive the IMU data 104 including the first IMU data 104(1), the second IMU data 104(2), and the third IMU data 104(3). In some examples, the first data, second data, and third data may be received in parallel (e.g., substantially simultaneously). In other examples, the first data, second data, and third data may be received at different times and/or in different orders. In some examples, any number of IMU data may be received based on the number of IMUs of the vehicle.

At operation 504(1), the method 500 may include calculating a rotation of the first IMU relative to the second IMU based on the first data and the second data. Similarly, at operation 504(2), the method 500 includes calculating a rotation of the second IMU relative to the third IMU based on the second data and the third data. For instance, the computing devices 110 may calculate the rotations of the first IMU, second IMU, and/or third IMU relative to each other. In some examples, the rotation of the first IMU relative to the second IMU and the rotation of the second IMU relative to the third IMU may be calculated in parallel (e.g., substantially simultaneously) and, in other examples, the relative rotations may be calculated at different times and in different orders. In at least one example, the computing devices 110 may calculate the relative rotations of the IMUs using the least squares estimations and/or matrix QR decompositions techniques described herein.

At operation 506, the method 500 includes detecting a fault associated with either one of the first IMU or the second IMU. For instance, the computing devices 110 may detect a scale factor error or a shear error associated with either the first IMU or the second IMU based at least in part on calculating the relative rotation between the two IMUs.

At operation 508, the method 500 includes determining that the second IMU and the third IMU are functioning properly. For instance, the computing devices 110 may not detect a fault associated with either the second IMU or the third IMU based at least in part on calculating the relative rotation between the two IMUs. In other words, both the second IMU and the third IMU may be set to the same scale factor setting and each not indicating shearing between them.

At operation 510, the method 500 includes determining that the fault is associated with the first IMU rather than the second IMU. For instance, the computing devices 110 may determine that the fault is associated with the first IMU rather than the second IMU since the relative rotation between the second IMU and the third IMU does not indicate a fault associated with either the second IMU or the third IMU. However, because the fault was indicated between either the first IMU or the second IMU, using process of elimination the computing devices 110 may determine that the faulty IMU is the first IMU. In at least one example, the method 500 may also include calculating a rotation of the first IMU relative to the third IMU, and this may help to confirm that the first IMU is the faulty IMU. In examples, any number combination of IMUs may be used to determine which specific IMU is not calibrated/functioning properly.

At operation 512, the method 500 may include performing an action with respect to the first IMU to correct for the fault. For instance, the one or more computing devices 110 may perform the action with respect to the fault IMU 102 to correct for the fault. In some examples, the action may include recalibrating the first IMU to correct for a scale factor error or shear error, outputting an indication that the first IMU needs to be re-mounted to the vehicle, outputting an indication that the first IMU needs to be replaced with a new IMU, and the like. In various examples, the specific action depends on the type of fault identified with respect to the first IMU (e.g., whether the fault is a scale error, shear error, rotation error, etc.). In some examples, the action may include performing calibration with higher compute resources and/or different algorithms, causing the vehicle to pull over/stop, reweighting sensor data contributions from the IMUs, etc.

The various techniques described herein may be implemented in the context of computer-executable instructions or software, such as program modules, that are stored in computer-readable storage and executed by the processor(s)

of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A. A system comprising: one or more processors; and one or more non-transitory computer-readable media storing instructions that, when executed by the one or more processors, cause the system to perform operations comprising: receiving, from a first inertial measurement unit (IMU) that is coupled to a vehicle, first data associated with a movement of the vehicle as the vehicle traverses an environment; receiving, from a second IMU that is coupled to the vehicle, second data associated with the movement of the vehicle; receiving, from a third IMU that is coupled to the vehicle, third data associated with the movement of the vehicle; calculating, based at least in part on the first data and the second data, a first relative rotation between the first IMU and the second IMU; calculating, based at least in part on the first data and the third data, a second relative rotation between the first IMU and the third IMU; based at least in part on the first relative rotation and the second relative rotation, detecting a fault associated with the first IMU; and performing an action with respect to the first IMU to correct for the fault.

B. The system as recited in paragraph A, the operations further comprising: determining that the fault is at least one of a scale error associated with the first IMU or a shear error associated with the first IMU; and calibrating the first IMU to reduce the scale error or the shear error.

C. The system as recited in any one of paragraphs A-B, wherein the first data is first gyroscope data measured by a first gyroscope of the first IMU, the second data is second gyroscope data measured by a second gyroscope of the second IMU, and the third data is third gyroscope data measured by a third gyroscope of the third IMU.

D. The system as recited in any one of paragraphs A-C, wherein calculating the first relative rotation between the first IMU and the second IMU comprises: calculating a relative rotation matrix based at least in part on inputting the first data and the second data into a least squares estimation equation; and performing a decomposition of the relative rotation matrix to determine an orthogonal matrix and an upper right triangular matrix, wherein a diagonal value of the upper right triangular matrix is indicative of a scale error associated with the first IMU or the second IMU and an off-diagonal value of the upper right triangular matrix is indicative of a shear error associated with the first IMU or the second IMU.

E. A method comprising: receiving first data from a first inertial measurement unit (IMU) associated with a vehicle; receiving second data from a second IMU associated with the vehicle; receiving third data from a third IMU associated with the vehicle; calculating, based at least in part on one or more of the first data, the second data, or the third data, a set of rotations between pairs of the IMUs; determining, based at least in part on the set of rotations, a fault associated with the first IMU; and performing an action based at least in part on the fault.

F. The method as recited in paragraph E, wherein the fault associated with the first IMU is at least one of a scale error or a shear error.

G. The method as recited in any one of paragraphs E-F, wherein the fault associated with the first IMU is a scale error and the action comprises calibrating the first IMU to reduce the scale error.

H. The method as recited in any one of paragraphs E-G, wherein the fault associated with the first IMU is a shear error and the action comprises calibrating the first IMU to reduce the shear error.

I. The method as recited in any one of paragraphs E-H, wherein the first data is first gyroscope data measured by a first gyroscope of the first IMU, the second data is second gyroscope data measured by a second gyroscope of the second IMU, and the third data is third gyroscope data measured by a third gyroscope of the third IMU.

J. The method as recited in any one of paragraphs E-I, wherein calculating a rotation of the set of rotations comprises inputting the first data and the second data into an optimization equation to solve for the rotation.

K. The method as recited in any one of paragraphs E-J, wherein calculating a rotation of the set of rotations comprises: calculating a relative rotation matrix based at least in part on inputting the first data and the second data into a least squares estimation equation; and performing a decomposition of the relative rotation matrix to determine an orthogonal matrix and an upper right triangular matrix.

L. The method as recited in any one of paragraphs E-K, wherein a diagonal value of the upper right triangular matrix is indicative of a scale error associated with the first IMU or the second IMU and an off-diagonal value of the upper right triangular matrix is indicative of a shear error associated with the first IMU or the second IMU.

M. The method as recited in any one of paragraphs E-L, wherein the action comprises causing the vehicle to stop or down weighting a contribution of the first IMU.

N. One or more non-transitory computer-readable media storing instructions that, when executed by one or more processors, cause the one or more processors to perform operations comprising: receiving first data from a first inertial measurement unit (IMU) associated with a vehicle; receiving second data from a second IMU associated with the vehicle; receiving third data from a third IMU associated with the vehicle; calculating, based at least in part on one or more of the first data, the second data, or the third data, a set of rotations between pairs of the IMUs; determining, based at least in part on the set of rotations, a fault associated with the first IMU; and performing an action based at least in part on the fault.

O. The one or more non-transitory computer-readable as recited in paragraph N, wherein: the first data is first gyroscope data measured by a first gyroscope of the first IMU, the second data is second gyroscope data measured by a second gyroscope of the second IMU, the third data is third gyroscope data measured by a third gyroscope of the third IMU, and the first data, the second data, and the third data are representative of a movement of the vehicle while the vehicle is traversing an environment.

P. The one or more non-transitory computer-readable as recited in any one of paragraphs N-O, wherein the fault associated with the first IMU is at least one of a scale error or a shear error.

Q. The one or more non-transitory computer-readable as recited in any one of paragraphs N-P, wherein calculating a rotation of the set of rotations comprises inputting the first data and the second data into an optimization equation to solve for the rotation.

R. The one or more non-transitory computer-readable as recited in any one of paragraphs N-Q, wherein calculating a rotation of the set of rotations comprises: calculating a relative rotation matrix based at least in part on inputting the first data and the second data into a least squares estimation equation; and performing a decomposition of the relative rotation matrix to determine an orthogonal matrix and an upper right triangular matrix.

S. The one or more non-transitory computer-readable as recited in any one of paragraphs N-R, wherein a diagonal value of the upper right triangular matrix is indicative of a scale error associated with the first IMU or the second IMU and an off-diagonal value of the upper right triangular matrix is indicative of a shear error associated with the first IMU or the second IMU.

T. The one or more non-transitory computer-readable as recited in any one of paragraphs N-S, wherein the fault associated with the first IMU is a scale error and the action comprises calibrating the first IMU to reduce the scale error.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving, from a first inertial measurement unit (IMU) that is coupled to a vehicle, first data associated with a movement of the vehicle as the vehicle traverses an environment;
receiving, from a second IMU that is coupled to the vehicle, second data associated with the movement of the vehicle;
receiving, from a third IMU that is coupled to the vehicle, third data associated with the movement of the vehicle;
calculating, based at least in part on the first data and the second data, a first relative rotation between the first IMU and the second IMU, the first relative rotation indicative of a fault associated with one of the first IMU or the second IMU;
calculating, based at least in part on the second data and the third data, a second relative rotation between the second IMU and the third IMU, the second relative rotation indicative of proper functioning associated with both the second IMU and the third IMU;
based at least in part on the first relative rotation being indicative of the fault and the second relative rotation being indicative of the proper functioning, determining that the fault is associated with the first IMU; and
performing an action to adjust for the fault, the action comprising at least one of:
calibrating the first IMU;
configuring a software driver connected to the first IMU;
down weighting a contribution of the first IMU;
causing a recoupling of the first IMU to the vehicle; or
causing a stoppage of the vehicle.

2. The system of claim 1, the operations further comprising:
determining that the fault is at least one of a scale error associated with the first IMU or a shear error associated with the first IMU,
wherein the action comprises calibrating the first IMU to reduce the scale error or the shear error.

3. The system of claim 1, wherein the first data is first gyroscope data measured by a first gyroscope of the first IMU, the second data is second gyroscope data measured by a second gyroscope of the second IMU, and the third data is third gyroscope data measured by a third gyroscope of the third IMU.

4. The system of claim 1, wherein calculating the first relative rotation between the first IMU and the second IMU comprises:
calculating a relative rotation matrix based at least in part on inputting the first data and the second data into a least squares estimation equation; and
performing a decomposition of the relative rotation matrix to determine an orthogonal matrix and an upper right triangular matrix,
wherein a diagonal value of the upper right triangular matrix is indicative of a scale error associated with the first IMU or the second IMU and an off-diagonal value of the upper right triangular matrix is indicative of a shear error associated with the first IMU or the second IMU.

5. A method comprising:
receiving first data from a first inertial measurement unit (IMU) associated with a vehicle;
receiving second data from a second IMU associated with the vehicle;
receiving third data from a third IMU associated with the vehicle;
calculating, based at least in part on one or more of the first data, the second data, or the third data, a set of rotations between pairs of the IMUs;
determining a presence of a fault associated with the first IMU based at least in part on the set of rotations indicating a presence of the fault between a first pair of the IMUs and an absence of the fault between a second pair of the IMUs; and
performing an action based at least in part on the fault, the action comprising at least one of:
calibrating the first IMU,
configuring a software driver connected to the first IMU,
down weighting a contribution of the first IMU,
causing a recoupling of the first IMU to the vehicle, or
causing a stoppage of the vehicle.

6. The method of claim 5, wherein the fault associated with the first IMU is at least one of a scale error or a shear error.

7. The method of claim 5, wherein the fault associated with the first IMU is a scale error and the action comprises calibrating the first IMU to reduce the scale error.

8. The method of claim 5, wherein the fault associated with the first IMU is a shear error and the action comprises calibrating the first IMU to reduce the shear error.

9. The method of claim 5, wherein the first data is first gyroscope data measured by a first gyroscope of the first IMU, the second data is second gyroscope data measured by a second gyroscope of the second IMU, and the third data is third gyroscope data measured by a third gyroscope of the third IMU.

10. The method of claim 5, wherein calculating a rotation of the set of rotations comprises inputting the first data and the second data into an optimization equation to solve for the rotation.

11. The method of claim 5, wherein calculating a rotation of the set of rotations comprises:
calculating a relative rotation matrix based at least in part on inputting the first data and the second data into a least squares estimation equation; and
performing a decomposition of the relative rotation matrix to determine an orthogonal matrix and an upper right triangular matrix.

12. The method of claim 11, wherein a diagonal value of the upper right triangular matrix is indicative of a scale error associated with the first IMU or the second IMU and an off-diagonal value of the upper right triangular matrix is indicative of a shear error associated with the first IMU or the second IMU.

13. One or more non-transitory computer-readable media storing instructions that, when executed by one or more processors, cause the one or more processors to perform operations comprising:
receiving first data from a first inertial measurement unit (IMU) associated with a vehicle;
receiving second data from a second IMU associated with the vehicle;
receiving third data from a third IMU associated with the vehicle;
calculating, based at least in part on one or more of the first data, the second data, or the third data, a set of rotations between pairs of the IMUs;
determining a presence of a fault associated with the first IMU based at least in part on the set of rotations indicating a presence of the fault between a first pair of the IMUs and an absence of the fault between a second pair of the IMUs; and
performing an action based at least in part on the fault, the action comprising at least one of:
calibrating the first IMU,
configuring a software driver connected to the first IMU,
down weighting a contribution of the first IMU,
causing a recoupling of the first IMU to the vehicle, or
causing a stoppage of the vehicle.

14. The one or more non-transitory computer-readable of claim 13, wherein:
the first data is first gyroscope data measured by a first gyroscope of the first IMU,
the second data is second gyroscope data measured by a second gyroscope of the second IMU,
the third data is third gyroscope data measured by a third gyroscope of the third IMU, and
the first data, the second data, and the third data are representative of a movement of the vehicle while the vehicle is traversing an environment.

15. The one or more non-transitory computer-readable of claim 13, wherein the fault associated with the first IMU is at least one of a scale error or a shear error.

16. The one or more non-transitory computer-readable of claim 13, wherein calculating a rotation of the set of rotations comprises inputting the first data and the second data into an optimization equation to solve for the rotation.

17. The one or more non-transitory computer-readable of claim 13, wherein calculating a rotation of the set of rotations comprises:
calculating a relative rotation matrix based at least in part on inputting the first data and the second data into a least squares estimation equation; and
performing a decomposition of the relative rotation matrix to determine an orthogonal matrix and an upper right triangular matrix.

18. The one or more non-transitory computer-readable of claim 17, wherein a diagonal value of the upper right triangular matrix is indicative of a scale error associated with the first IMU or the second IMU and an off-diagonal value of the upper right triangular matrix is indicative of a shear error associated with the first IMU or the second IMU.

19. The one or more non-transitory computer-readable of claim 13, wherein the fault associated with the first IMU is a scale error and the action comprises calibrating the first IMU to reduce the scale error.

20. The method of claim 5, further comprising determining a type of the fault associated with the first IMU, wherein the action performed is further based at least in part on the type of the fault.

* * * * *